United States Patent [19]
Zediker et al.

[11] Patent Number: 5,847,816
[45] Date of Patent: Dec. 8, 1998

[54] FIBER OPTIC MICRO-DOPPLER LADAR SYSTEM AND OPERATING METHOD THEREFOR

[75] Inventors: Mark S. Zediker, Florissant; Robert R. Rice, Chesterfield, both of Mo.; Wil S. Otaguro, Huntington Beach, Calif.

[73] Assignee: McDonnell Douglas Corporation, St. Louis, Mo.

[21] Appl. No.: 782,175

[22] Filed: Jan. 14, 1997

[51] Int. Cl.⁶ ................................ G01C 3/08; G01P 3/36
[52] U.S. Cl. .......................................... 356/5.09; 356/28.5
[58] Field of Search ................................. 356/5.09, 5.11, 356/28.5; 359/182, 191

[56] References Cited

U.S. PATENT DOCUMENTS

| | | | |
|---|---|---|---|
| 4,757,268 | 7/1988 | Abrams et al. | 330/413 |
| 5,267,011 | 11/1993 | Callender | 356/5 |
| 5,434,662 | 7/1995 | Rockwell et al. | 356/4.01 |
| 5,530,582 | 6/1996 | Clark | 359/333 |
| 5,621,514 | 4/1997 | Paranto et al. | 359/5.09 |
| 5,696,782 | 12/1997 | Harter et al. | 372/25 |

*Primary Examiner*—Mark Hellner
*Attorney, Agent, or Firm*—Westerlund & Powell, P.C.; Raymond H.J. Powell, Jr.; Robert A. Westerlund

[57] ABSTRACT

A micro-doppler ladar system for identifying and analyzing a target of interest includes a transmitter and coherent receiver pair, each of which includes a fiber optic power amplifier, and a controller. Preferably, the transmitter includes a master oscillator for generating a primary laser beam, a voltage controlled oscillator (VCO) for generating a VCO signal having a predetermined, repetitive frequency pattern, a frequency shifting circuit for varying the frequency of the primary laser beam responsive to the VCO signal to thereby produce a frequency-varying primary laser signal, and the optical fiber amplifier, which amplifies the frequency-varying primary laser signal to thereby produce a transmit laser beam. In addition, the coherent receiver, which responds to backscattered light produced by the interaction of the transmit laser beam with the target of interest, includes an optical fiber pre-amplifier for amplifying the backscattered light to thereby produce an amplified return laser beam, and a phase locked loop receiving the primary laser beam and the amplified return laser beam for generating an electrical signal indicative of range, velocity and a characteristic signature of the target of interest. The transmitter and coherent receiver can be operated in a target acquisition mode of operation for determining range and velocity, and a signature acquisition mode of operation for determining a characteristic signature of the target of interest responsive to the electrical signal. A method for operating the micro-doppler ladar system is also described.

42 Claims, 6 Drawing Sheets

FIBER OPTIC MICRO-DOPPLER LADAR SYSTEM AND OPERATING METHOD THEREFOR

BACKGROUND OF THE INVENTION

The present invention relates generally to ladar systems. More specifically, the present invention relates to a micro-doppler ladar system constructed primarily with fiber optic elements. A method of operating a micro-doppler ladar system is also disclosed.

Lidar, laser radar, optical radar, and ladar (hereinafter ladar) are all names used for "radar" systems utilizing electromagnetic radiation at optical frequencies. The radiation used by ladar is at wavelengths which are 10,000 to 100,000 times shorter than that used by conventional radar. Radiation (Photons) scattered by the target is (are) collected and processed to yield information about the target and/or the path to the target. Early conventional radars and ladars observed only the intensity of the collected radiation and the time delay from transmission to collection. Modern ladars also observe intensity in addition to time delay. However, some so-called "coherent ladars" record information about the phase of the scattered radiation with respect to a local reference.

Ladar systems may be further classified as continuous-wave (CW) or pulsed as well as focused or collimated. CW ladar systems are generally used when the signal may be integrated over long time periods and/or when the target is nearby. They are also convenient to use when measuring average properties of the path to the target. Focusing is mainly performed using CW ladars to permit them to make a more sensitive measurement over a smaller span of ranges. In contrast, pulsed ladars use much higher power levels during the laser pulse than can be maintained with a CW laser, producing higher signal-to-noise ratios for the collected radiation. Pulsed ladars are usually chosen for long-range remote sensing and when signal integration over a long time period is impractical.

Ladar uses the same principle as RADAR, i.e., the ladar system transmits light to a target, the transmitted light interacts with and is changed by the target, and some of this light is reflected/scattered back (returned) to the ladar system where it can be analyzed. The change in the properties of the backscattered light enables some property of the target to be determined. For example, the round trip time required for the light to travel to the target and back to the ladar system is commonly used to determine the range to the target.

Ladar systems are generally divided into three generic types: range finding systems; DIAL systems; and doppler ladar systems. Range finders are the simplest type of ladar system; they are used to measure the distance from the ladar system to a solid or hard target. Differential Absorption Ladar (DIAL) systems are used to measure chemical concentrations (such as ozone, water vapor, pollutants) in the atmosphere. A DIAL system uses two different laser wavelengths which are selected so that one of the wavelengths is absorbed by the molecule of interest while the other wavelength is not. The difference in intensity of the two return signals can be used to deduce the concentration of the molecule being investigated.

Doppler ladar systems are used to measure the velocity of a target. When the light transmitted from the ladar system strikes a target moving towards or away from the ladar system, the wavelength of the light reflected/scattered off the target will be changed slightly. This is known as a Doppler shift—hence the term Doppler Ladar.

If the target is moving away from the ladar system, the return light will have a longer wavelength (sometimes referred to as a red shift); if the target is moving towards the ladar system, the return light will be at a shorter wavelength (producing a so-called blue shift).

Ladar systems may also be classified as either bistatic or monostatic. Bistatic ladar systems require separate locations for the transmitter and for the receiver. In contrast, monostatic ladar systems require only one location. It will be appreciated that the location of a target is determined by a monostatic, pulsed, ladar system on the basis of knowledge of the laser pointing direction, and of the time delay between the firing of the laser pulse and the detection of the signal.

Coherent (homodyne or heterodyne) detection ladar systems preserve the phase information of the backscattered photons. For example, the coherent ladar receiver creates an electrical current corresponding to the phase of the backscattered light. This constitutes a first advantage of coherent ladar systems. In addition to the intensity of the backscattered photons which is recorded in conventional non-coherent (or incoherent or direct detection) ladar systems, the signals produced by the coherent ladar system contain additional information about the frequency spectrum and polarization of the backscattered photons. The first moment or mean value of the frequency spectrum yields the target's mean velocity.

Optical detection in coherent ladar systems starts with illuminating the optical detector with a continuous-wave laser beam produced by a local oscillator (LO), in addition to the backscattered photons. The detector responds to the square of the total optical field illuminating it and, therefore, produces the cross product of the backscattered and LO optical fields. Both the backscattered and LO fields are sinusoids, as are their cross products. It will be appreciated that these products must contain both sum and difference frequency terms. The desired information is contained in the portion of the detector's output current that oscillates at the frequency difference between the LO laser beam and any received, backscattered light.

The LO frequency is usually offset from the anticipated frequency of the backscattered photons; in contrast, polarization, direction, and curvature of the local oscillator output must closely match that of the backscattered light. The desired information is contained in the portion of the detector's output signal that oscillates at the frequency difference between the laser beam generated by the local oscillator and the backscattered light. This oscillating current or "signal" may be conveniently processed with standard electronic circuits.

A second advantage of a coherent ladar system is its greater sensitivity than non-coherent ladar systems under conditions of low signal-to-noise ratio (SNR). This is due to four reasons.

First, a mode of operation called shot noise limited (SNL) may be employed. This is possible because both the signal power (square of the current) and the LO shot noise power in the detector's output are proportional to the incident LO optical power. The LO power may be increased until the LO shot noise dominates the other noise sources, such as background light, dark current, Johnson (thermal) noise, and amplifier noise. The signal power increases automatically with the LO shot noise power. This procedure, equivalent to setting the other noise sources to zero, can greatly increase the SNR.

Second, the oscillating signal at the detector output is only due to photons which are spatially phase matched to the LO, effectively eliminating noise from background light at other wavelengths and from other directions. Therefore, coherent ladar is not degraded by daytime operation.

Third, the oscillating current at the frequency difference between the LO and the backscattered light may be passed through a very narrow band electronic filter which eliminates all noise in frequency regions outside the predicted possible signal locations. This is only possible because the optical heterodyne (homodyne) process preserves the spectrum of the optical signal; simply translating it from THz to MHZ. This elimination of noise has not yet been achieved in non-coherent ladar. Since the non-coherent optical detection step combines photons of all wavelengths into electrical currents that overlap in frequency, no electrical filtering is possible. A sufficiently narrow bandpass optical filter in front of the detector would work, but such narrow band optical filters are not currently available.

Fourth, the higher frequency of the coherent ladar electrical current, the frequency difference between the LO and the backscattered light, which is selectable by the system designer, results in less 1/f noise.

In short, advantages of conventional coherent ladar systems include the straightforward measurement of target velocity and vibration, and much greater sensitivity. The use of micro-doppler ladar to detect target vibrations has been established by a number of Government initiatives, including the Radiant Mist—Low Probability of Intercept ATD program, to classify non-cooperative targets. The benefits derived from coherent ladar systems come at the cost of the addition of the LO laser, greater sensitivity to alignment, greater sensitivity to phase perturbations from the optics elements, and greater sensitivity to phase perturbations from the atmosphere.

Early coherent ladar systems used $CO_2$ lasers at wavelengths of 9–11 micrometers ($\mu$m) while more recent ladar systems have been proposed using laser wavelengths between 1 and 2 $\mu$m. An important application of these coherent ladar systems is the detection and classification of a non-cooperative target. It will be appreciated that the target can be classified and identified by exploiting its micro-doppler signature. In the micro-doppler ladar technique, vibrations of the target phase modulate the laser light reflected back and the induced modulation is detected by coherent (homodyne or heterodyne) detection. To detect the vibrations reliably using heterodyne detection for example, the laser transmitter and receiver local oscillators each must have natural oscillation linewidths that are narrower than the spectrum of the induced phase deviations.

As discussed above, most prototype doppler ladar systems and associated research with respect to such systems have used a long-coherence-length $CO_2$ laser operating in a $TEM_{00}$ mode as the transmitter. This selection was made for several reasons. First, the power required to interrogate targets at ranges of 40 kilometers (km) or greater has been available from $CO_2$ lasers, operating in a Master Oscillator-Power Amplifier (MO-PA) configuration, with the narrow linewidth needed. Second, the processing of the return signal requires coherent detection, which can easily be accomplished for the $CO_2$ system. Third, the atmospheric transmission is good in the 10 $\mu$m region of the spectrum and, more importantly, the effects of atmospheric turbulence are largely negligible. Moreover, the high power laser radiation emitted at this wavelength is eyesafe. Lastly, the $CO_2$ technology is quite mature and, thus, the components necessary to construct such a system are expensive but readily available.

Unfortunately, the $CO_2$ micro-doppler sensor has drawbacks that make a solid state laser alternative very attractive. Thus, while results obtained to date under the Radiant Mist program have been promising, a $CO_2$ micro-doppler sensor has drawbacks that make a short wavelength solid state alternative very attractive.

First, the sensitivity of the ladar system to target vibrations is proportional to the optical carrier frequency. The doppler shift in the return signal is given by $(2V/\lambda)$, where V is the relative velocity and $\lambda$ is the optical wavelength. Hence, it will be appreciated that the micro-doppler frequency shift is 10× greater at 1064 nm, and 7× greater at 1550 nm than that of the $CO_2$ laser system operating at 10.6 $\mu$m. Moreover, the size, weight, and prime power required for the current $CO_2$ baseline system are considerably greater than desired. In addition, the packaging and installation of the $CO_2$ ladar system intended for use on a conventional aircraft presents significant difficulties.

With respect to alternate potential transmitters in the near-infrared, the best options would be diode pumped solid state lasers operating in the vicinity of 1.06 $\mu$m, 1.34 $\mu$m, 1.54 $\mu$m, and 2.05 $\mu$m. Such lasers are bulky and relatively inefficient when operated in a $TEM_{00}$ mode, and exhibit very narrow tuning ranges about the transition frequencies. Indeed, high $TEM_{00}$ mode power has not been reliably demonstrated at 1.54 $\mu$m, which wavelength appears to provide the best compromise between sensitivity, source efficiency, and eye safety. The conventional diode pumped solid state laser systems operating in this wavelength region are relatively costly, particularly with high power, highly coherent $TEM_{00}$ mode systems.

Another development effort is underway at the National Aeronautics and Space Administration (NASA) to develop a spaceborne coherent doppler wind ladar system. The global, accurate, unbiased, high-spatial-resolution measurement of winds is highly desirable for global climate change research and for improved numerical weather prediction. The developed technology will likely assist the wind measurement needs of the DOD, NASA, DOE, EPA, and FAA; and should find numerous other applications in industry, university, civilian, government, military, and research endeavors.

NASA has identified the key technologies needed for a coherent Doppler ladar wind sounding system as being:

1. a pulsed transmitter laser;
2. a frequency-agile continuous-wave (CW) local oscillator (LO) laser;
3. an optical detector;
4. lag angle compensation optics;
5. low-mass optics for beam expansion and scanning;
6. fiber optic components for beam routing, alignment, and interferometric combining; and
7. ladar auto alignment technology.

More specifically, the doppler ladar system under development by NASA has focused on a pulsed laser transmitter of the Q-switched diode pumped Ho:YLF oscillator variety. Additionally, the NASA project has determined that fiber optic components are to be used simply as interconnection elements.

What is needed is a narrow linewidth, single frequency solid state laser transmitter operating in the near-infrared that is both compact and efficient. Preferably, such a ladar system laser transmitter would also be scalable to a high average power. Moreover, to complement the more efficient transmitter, a more sensitive coherent laser receiver is desirable in a micro-doppler ladar system.

SUMMARY OF THE INVENTION

Based on the above and foregoing, it can be appreciated that there presently exists a need in the art for a micro-doppler ladar system which overcomes the above-described deficiencies. The present invention was motivated by a desire to overcome the drawbacks and shortcomings of the presently available technology, and thereby fulfill this need in the art.

The preferred embodiment according to the present invention is a fiber optic laser transmitter and receiver architecture that provides these desirable features so as to permit construction of a practical micro-doppler ladar system.

One object according to the present invention is to provide a fiber optic micro-doppler ladar system having a greater sensitivity than that of a conventional $CO_2$ ladar system.

Another object according to the present invention is to provide a fiber optic micro-doppler ladar system permitting a choice between several wavelength windows in the near-infrared while retaining a common architecture.

Still another object according to the present invention is to provide a fiber optic micro-doppler ladar system having a higher efficiency than that of conventional diode pumped highly coherent $TEM_{00}$ mode laser transmitters.

Yet another object according to the present invention is to provide a fiber optic micro-doppler ladar system having a significant degree of tuneablilty over wide bands around the transition frequencies.

Another object according to the present invention is to provide a fiber optic micro-doppler ladar system having unprecedented packaging benefits as compared to conventional diode pumped $TEM_{00}$ mode lasers.

A further object according to the present invention is to provide a fiber optic micro-doppler ladar system including a fiber optic preamplifier having compatibility with advanced coherent optical receivers.

A still further object according to the present invention is to provide a fiber optic micro-doppler ladar system which can be fabricated at a low cost. Major cost benefits are achieved by leveraging on fiber optic amplifier development in the telecommunications field.

These and other objects, features and advantages according to the present invention are provided by a micro-Doppler ladar system for identifying and analyzing a target of interest. Preferably, the ladar system includes a transmitter for producing a transmit laser beam by amplification of a primary laser beam in an optical fiber amplifier, a coherent receiver responsive to backscattered light produced by interaction of the transmit laser beam with the target of interest and generating range and velocity data and a characteristic signature of the target of interest, and a controller for controlling operation of the transmitter and the receiver.

More specifically, the transmitter includes a master oscillator for generating the primary laser beam, a voltage controlled oscillator (VCO) for generating a VCO signal having a predetermined, repetitive frequency pattern, a frequency shifting device for varying the frequency of the primary laser beam responsive to the VCO signal to thereby produce a frequency-varying primary laser signal, and an optical fiber amplifier for amplifying the frequency-varying primary laser signal to thereby produce a transmit laser beam. Advantageously, the coherent receiver includes an optical fiber preamplifier for amplifying the backscattered light to thereby produce an amplified return laser beam and a phase locked loop receiving the primary laser beam and the amplified return laser beam for generating an electrical signal indicative of range, velocity and a characteristic signature of the target of interest.

According to one aspect of the present invention, the controller operates the transmitter and coherent receiver in a target acquisition mode of operation wherein the range and velocity data are easily extracted from the electrical signals and a signature acquisition mode of operation wherein the characteristic signature is easily extracted from the electrical signal.

According to another aspect of the present invention, the optical fiber amplifier includes N serially coupled rare earth doped optical fiber sections, and N pump sources, each of the pump sources operatively connected to a corresponding one of the optical fiber sections. Preferably, N is an integer greater than or equal to 2. Alternatively, the optical fiber amplifier includes a beam splitter receiving the primary laser beam and generating N secondary laser beams, N parallel rare earth doped optical fiber sections, each of the optical fiber sections amplifying a respective one of the N secondary laser beams to thereby produce N tertiary laser beams, and an optical combiner combining the N tertiary laser beams to thereby produce the transmit laser beam. Again, N preferably is an integer greater than or equal to 2.

These and other objects, features and advantages of the present invention are provided by a micro-Doppler ladar system for identifying and analyzing a target of interest, which includes:

a first device for generating a primary laser beam;

a second device for amplifying the primary laser beam in an optical fiber amplifier and for generating a transmit laser beam;

a third device for transmitting the transmit laser beam towards the target of interest;

a fourth device for receiving backscattered light produced by interaction between the transmit laser beam and the target of interest and for generating an electrical signal indicative of the target of interest;

a fifth device for determining range and velocity responsive to the electrical signal; and a sixth device for determining a characteristic signature of the target of interest other than range and velocity.

Advantageously, the objects of the present invention are provided by a method of operating a micro-Doppler ladar system including a transmitter and coherent receiver for identifying and analyzing a target of interest. Preferably, the method includes steps for:

generating a primary laser beam;

amplifying the primary laser beam in an optical fiber amplifier so as to generate a transmit laser beam;

transmitting the transmit laser beam towards the target of interest;

receiving backscattered light produced by interaction between the transmit laser beam and the target of interest and generating an electrical signal indicative of the target of interest;

determining range and velocity responsive to the electrical signal; and ascertaining a characteristic signature of the target of interest different from both range and velocity.

These and other object features and advantages according to the present invention are provided by a transmitter for a micro-Doppler ladar system adapted to identify and analyze a target of interest. Preferably, the transmitter includes a master oscillator generating a primary laser beam, a voltage controlled oscillator (VCO) for generating a VCO signal having a predetermined, repetitive frequency pattern, a frequency shifting device for varying the frequency of the primary laser beam responsive to the VCO signal to thereby produce a frequency-varying primary laser signal, and an optical fiber amplifier for amplifying the frequency-varying primary laser signal to thereby produce a transmit laser beam.

BRIEF DESCRIPTION OF THE DRAWINGS

These and various other features and aspects of the present invention will be readily understood with reference to the following detailed description taken in conjunction with the accompanying drawings, in which.

DETAILED DESCRIPTION OF THE PREFERRED EMBODIMENTS

The ladar system according to the present invention advantageously utilizes a high power fiber optic laser (HPFOL) architecture which provides high efficiency, scalable output power, and unprecedented packaging flexibility. The HPFOL architecture also offers a highly effective transmitter solution for micro-doppler sensor systems, especially so for very long target classification ranges, e.g., ranges up to hundreds of kilometers (km), which requirement translates into the need for a high average power transmitter. The fiber optic micro-doppler ladar discussed immediately below builds upon two fundamental technologies: high power fiber optic amplifiers and coherent combination of beams from multiple emitters. As discussed previously, other companies and government laboratories are conducting related work, but this is the first time these two concepts have been joined to enable scalable laser output in a practical architecture.

As discussed above, a micro-doppler ladar system works by transmitting a highly coherent signal to a target that phase modulates the back-reflected light. The back scattered light is detected by a coherent receiver that recovers the induced phase modulation and hence the vibration spectrum of the target. The nature of the target (friend or foe) can be classified by comparing its vibration spectrum with spectra stored in a data base. The fiber optic micro-doppler ladar system according to the present invention uses a fiber optic technology which was developed for an entirely different application to enable operation in the near-infrared, where sensitivity is better but high power laser sources have been considered problematic. In this wavelength region, the innovative fiber optic micro-doppler ladar system discussed below provides significant benefits as compared to conventional systems which use diode pumped solid state laser sources.

Figure 1:
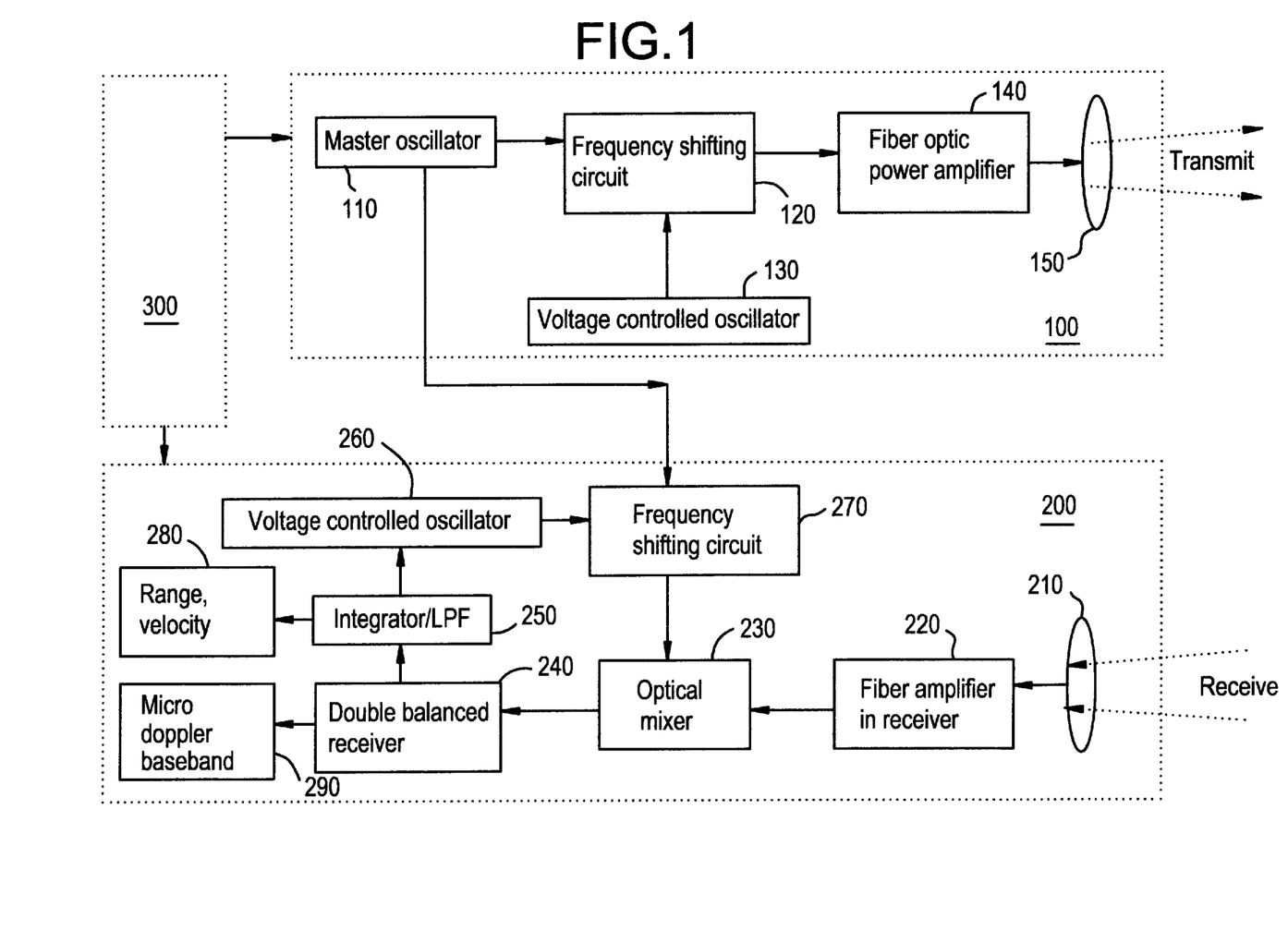
FIG. 1 is a high level block diagram of a fiber optic micro-doppler ladar system including both a transmitter and a receiver according to a preferred embodiment of the present invention.

A first preferred embodiment according to the present invention is illustrated in FIG. 1, wherein a fiber optic micro-doppler ladar system 1 includes a transmitter 100 and a receiver 200, both of which are preferably controlled by a controller 300.

Advantageously, the controller can include a computer, microcomputer or dedicated microprocessor for controlling the transmitter 100 and receiver 200 during predetermined first and second operating modes, as discussed in greater detail below.

In transmitter 100, a master oscillator (MO) 110 is connected to a fiber optic power amplifier 140 via a frequency shifting (FS) circuit 120, which FS circuit receives a modulation frequency signal produced by a voltage controlled oscillator 130. Preferably, master oscillator 110 is a stable, very narrow linewidth, laser, which is operating in a $TEM_{00}$ mode at a frequency within the gain spectrum of the power amplifier 140 and which is coupled by optical fiber to deliver a continuous wave signal to downstream components in the transmitter 100. It will be appreciated that the master oscillator laser 110 can be any conventional master oscillator laser; preferably, the master oscillator is a fiber laser oscillator. It should also be mentioned that some conventional components that are understood to be part of any practical fiber optic ladar system have been omitted from the drawings and detailed description of the preferred embodiments of the present invention so as not to obscure the fundamental features of the invention. For example, one of ordinary skill in this particular art would appreciate that an optical isolator would be located immediately downstream of the master oscillator 110 to prevent feedback from downstream components, e.g., power amplifier 140, that would induce instability in the master oscillator 110. The details of such components are well known to those skilled in the art and will not be discussed further.

Preferably, MO 110 generates a first signal with a coherence time Tc, where:

$$T_c = l_c/c = 2\pi/\Delta\omega, \tag{1}$$

where $I_C$ is the coherence length and $\Delta\omega$ is the linewidth of the laser beam. The first signal is preferably delivered to FS circuit 120, which performs a frequency translation or shifting function. The FS circuit 120 beneficially can be a photonic network or any one of several conventional devices such as an acousto-optic modulator. In any case, the frequency of the output signal $\omega_{out}(t)$ is translated up or down from the unmodulated carrier signal $\omega_0$ produced by the MO 110 by the frequency $\omega_{vco}(t)$ of the VCO 130. In other words, the output signal of FS circuit 120 can be determined from the expression:

$$\omega_{out}(t) = \omega_0 + \omega_{vco}(t). \tag{2}$$

This frequency translation advantageously permits transmission of a frequency chirp on the output signal to establish an estimate of range to target and velocity, as discussed in further detail below. It should be mentioned that the output signal of VCO 130 is a sawtooth function which, in an exemplary case, varies continuously from 10 to 100 and then back to 10 megahertz (MHZ). The sawtooth characteristic of the VCO 130 output was selected to minimize the stimulated Brillouin scattering (SBS) associated with power amplifier 140. It will be appreciated that suppression of SBS enables generation of a high power laser output beam with minimum beam degradation.

It should also be mentioned that the use of fiber optic power amplifier 140 to produce a high power output signal is one of the novel aspects of the preferred embodiments according to the present invention. As discussed above, the NASA wind Doppler Ladar system proposed the use of optical fibers for providing alignment and coupling functions; amplification devices in the NASA Doppler Ladar system are not constructed using optical fibers.

Figure 2:
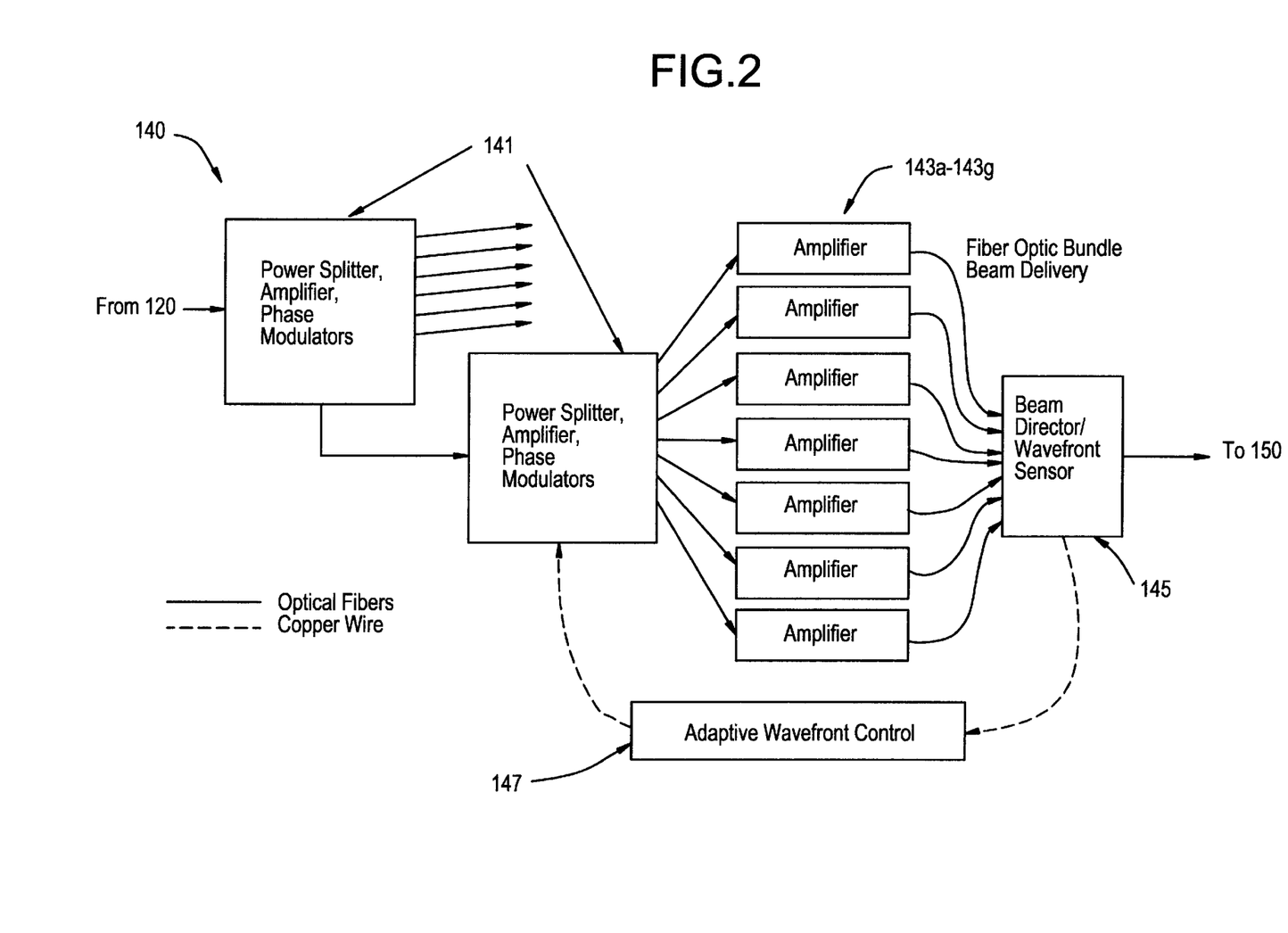
FIG. 2 is a high level block diagram of selected components of a first fiber optic amplifier which can be used in both the transmitter and receiver sections of the ladar system illustrated in FIG. 1.

As noted previously, a single fiber power amplifier 140 will suffice for some short range applications. However, a coherent array of optical fiber amplifiers collectively forming the fiber optic power amplifier 140 is particularly advantageous for those specific applications involving very long range or atmospheric conditions involving significant absorption or dispersion of the transmitted laser beam. A first preferred embodiment of a coherent phased array of fiber optic amplifiers suitable for use in present invention for generating high power laser beams needed for long range ladar system applications is shown in FIG. 2. This particular laser power amplifier is described in detail in copending, commonly assigned U.S. patent Application Ser. Nos. 08/471,870 and 08/611,474, which applications are incorporated herein by reference for all purposes.

It will be appreciated that the power splitter, amplifier and phase modulator elements 141 in FIG. 2 may be arranged in various configurations other than the exemplary arrangement illustrated in that Figure. The illustrated fiber optic power amplifier 140 of FIG. 2 includes a first stage composed of a first beam splitter element 141, for splitting a received laser beam into a number N of secondary laser beams. Each of the secondary laser beams is provided to a second beam splitter element 141, which produces a number M of tertiary laser beams from a respective one of the secondary laser beams. Each of the tertiary laser beams is amplified by a respective fiber amplifier generally denoted 143. It should be mentioned that although two separate stages of beam splitter elements 141 and one amplifier stage 143 are depicted in FIG. 2, the fiber optic power amplifier 140 according to the present invention beneficially can have more of less amplification stages. For example, when the firs and second beam splitter elements 141 include an optical amplifier 16 pumped by a pump source 18, a beam splitter 24 and, optionally, a number N×M phase modulators, respectively, a total of three amplification devices are included in the power amplifier 140.

Figure 3A:
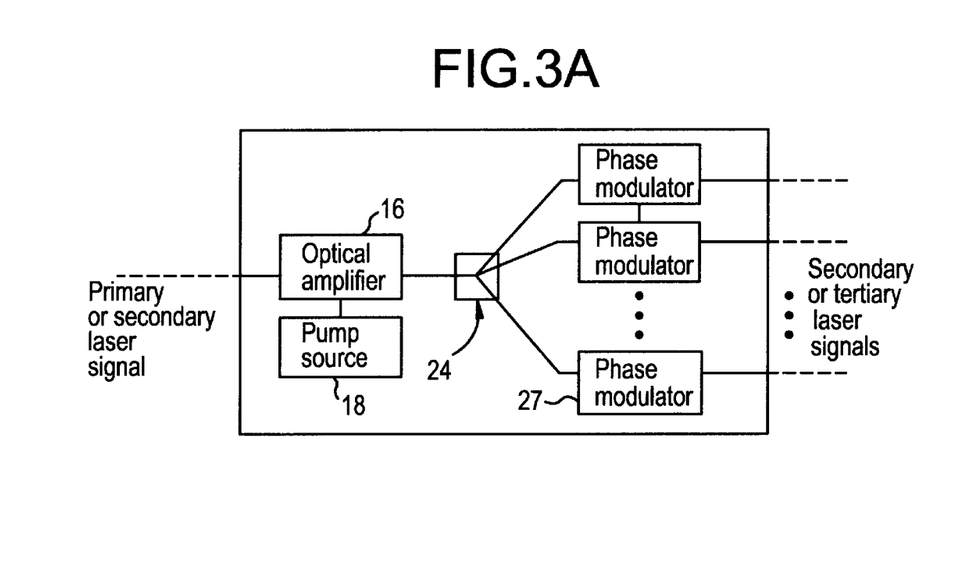
FIGS. 3a through 3c illustrate alternative preferred configurations of the selected optical elements within the fiber optic power amplifier as illustrated in FIGS. 1 and 2.
Figure 3B:
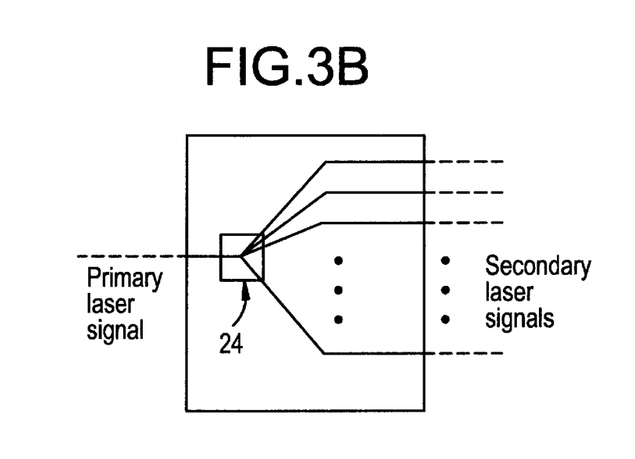

However, alternative configurations are possible without departing from the present invention. For example, the number of series connected elements 141 can be any number greater than of equal to 2. Moreover, it should be mentioned that the preferred embodiments of the present invention are not limited to the arrangement illustrated in FIG. 3a. For example, the first stage element 141 need not include either an amplifier 16 or a phase modulator 27 (FIG. 3b); alternatively, the first stage element 141 may include optical amplifier 16 but omit phase modulator 27. Needless to say, additional amplifier stages advantageously can be provided.

It will be noted that the fiber optic power amplifier 140 includes a phase modulator 27 in each optical path terminating at output device 150. It will be appreciated that the phase modulators are provided to ensure that all of the N×M laser beams output by power amplifier 140 arrive at the output device 150 with a predetermined phase profile to minimize the losses produced in output device 150. Advantageously, the power amplifier 140 can include a waveform sensor 145 in the output optical path, wherein the sensor signals are provided to phase modulators 27 in element 141 via an adaptive waveform controller 147. Examples of the construction and operation of waveform sensor 145 and waveform controller 147 are provided in above-referenced copending, commonly assigned U.S. patent application Ser. Nos. 08/471,870 and 08/611,474.

Figure 4:
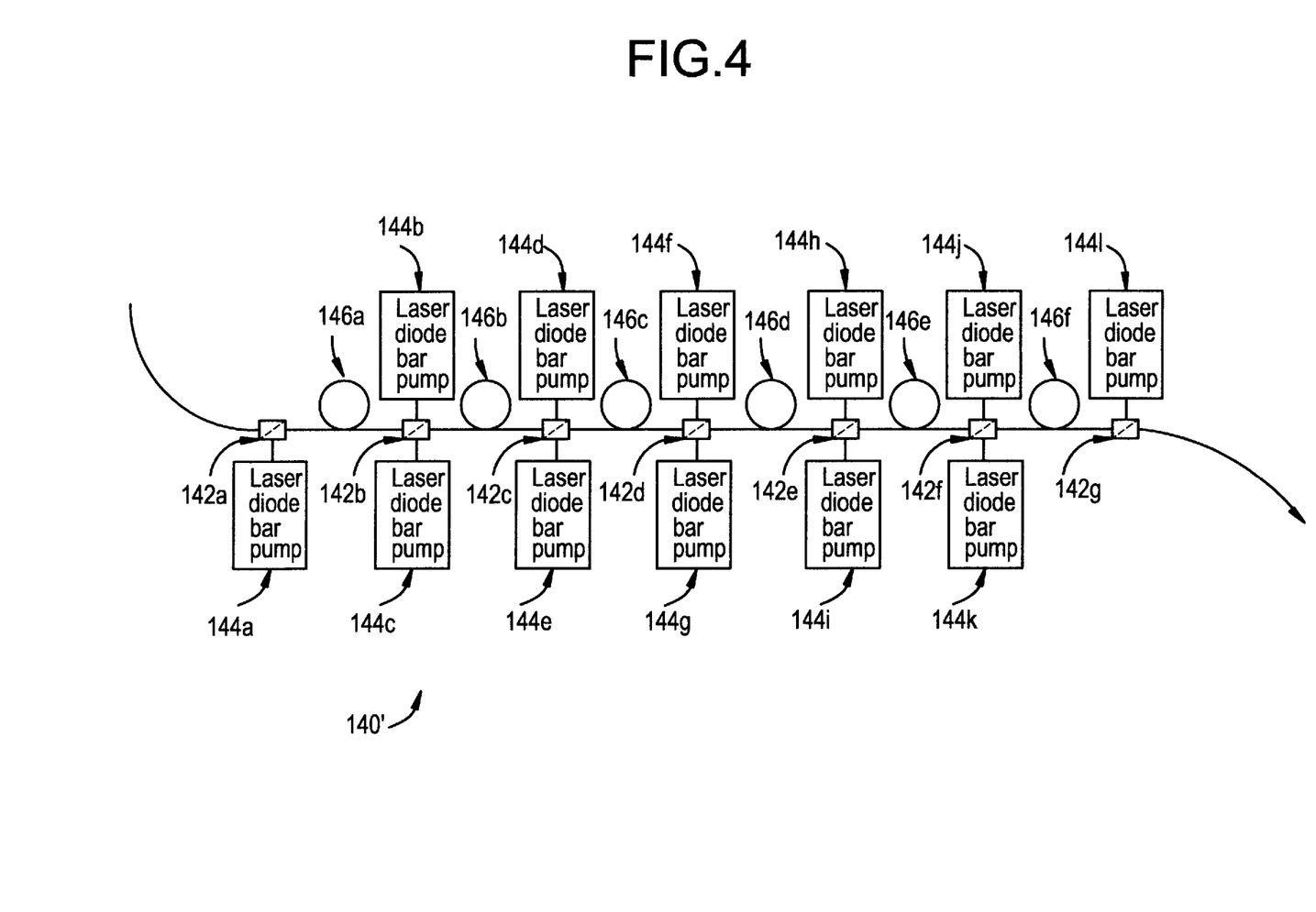
FIG. 4 is a high level block diagram of selected components of a second fiber optic amplifier which can be used in both the transmitter and receiver sections of the ladar system illustrated in FIG. 1.
Figure 5:
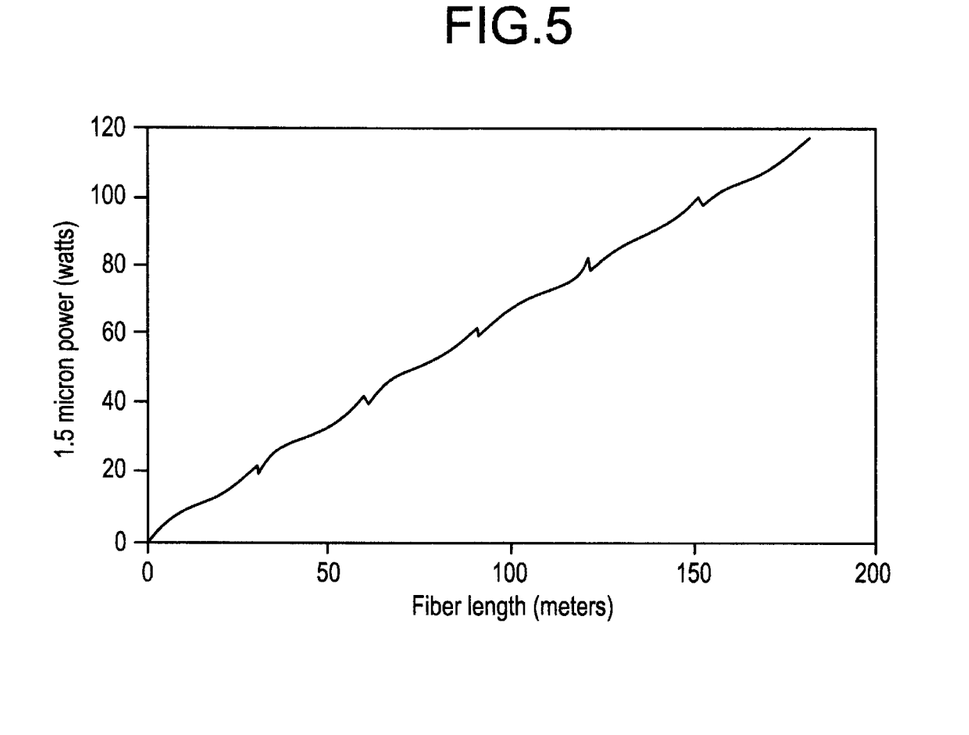
FIG. 5 is a plot of optical fiber length versus output power for the multistage fiber optic amplifier illustrated in FIG. 4.
Figure 6:
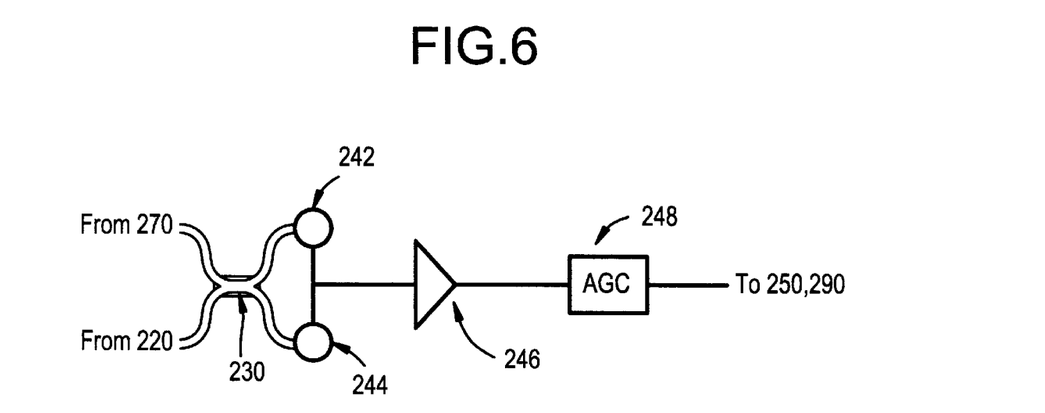
FIG. 6 is a schematic diagram of a double-balanced receiver which can be used in the ladar system depicted in FIG. 1.

An alternative preferred embodiment of the fiber optic power amplifier 140 is illustrated in FIG. 4, wherein a fiber optic power amplifier 140' according to a second preferred embodiment of the present invention includes a plurality of dichroic beam combiners, generally denoted 142, adjacent ones of which are separated from one another by a respective fiber amplifier stage 146. From FIG. 4, it will be noted that each dichroic beam combiner 142 is operatively coupled to at least one laser diode bar pump 144. Preferably, each fiber amplifier stage 146 consists of a predetermined length of rare earth doped optical fiber, which beneficially constitutes an amplifier section (gain medium). The optical fiber can advantageously be an optical fiber having a core doped with one of more rare earth elements, i.e., ytterbium, neodymium, praseodymium, erbium, holmium and thulium. Preferably, the optical fiber used in each fiber amplifier stage 146 is a dual core optical fiber consisting of an inner core doped with one or more rare earth elements, an outer core surrounding the inner core, and a cladding surrounding the outer core. Most preferably, the optic fiber amplifier includes one or more Yb:Er-doped optic fibers. In an exemplary case, the optic fiber amplifier includes one or more Yb:Er-doped single mode, e.g., $TEM_{00}$ mode, optical fibers.

Figure 3C:
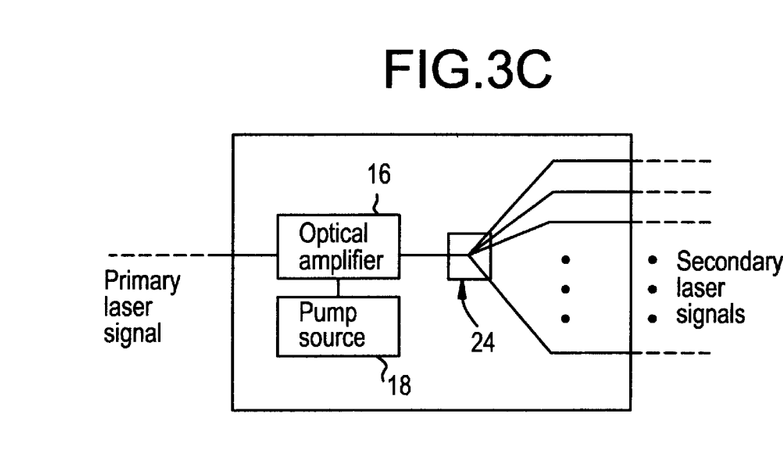

As illustrated in FIG. 4, the predetermined length of optical fiber, e.g., 30 feet of optical fiber, is looped tightly, e.g., in a four inch loop, to form a compact coil. It will be appreciated that each stage of the power amplifier 140' includes at least one optical isolator (not shown) for preventing feedback from a downstream stage which would induce instability in the upstream stage. It should also be mentioned that the power amplifier 140' depicted in FIG. 4 advantageously can be used in place of either the power amplifiers 143a–143g or the amplifier—pump source combinations depicted in FIGS. 3a and 3c.

Referring back to FIG. 1, the transmit optics 150 beneficially could be an optical lens (as shown), although a mirror, or an array of lensed fibers in a phased array could also be used. The function of the transmit optics 150 is to collimate the high power $TEM_{00}$ signal from the fiber optic power amplifier 140 and direct the collimated beam towards a distant target. Preferably, the transmit optics 150 is gimbal mounted so as to permit training of the transmitted laser beam to sweep a portion of the sky using a predetermined sweep pattern.

The receive optics 210, which advantageously can be the same optics as the transmit optics 150 used to transmit the output beam, collect back-scattered light from the distant target and couple it into a single mode diode pumped fiber optic preamplifier 220. For ease of explanation, the transmit optics 150 and the receive optics 210 are shown separately in FIG. 1. The function of the preamplifier 220 is to amplify the received signal to a higher, more convenient optical signal level and to enhance the signal-to-noise (SNR) of the receiver. It should be noted that while preamplifier 220 is not strictly required if the Double Balanced Receiver (DBR) 240 achieves signal-shot-noise-limited performance, it does provide a degree of margin and robustness for the phase-locked loop (PLL) acquisition function performed in the receiver 200.

As discussed in greater detail below, components in ladar receiver 200 including an optical combiner 230, the DBR 240, an integrator/low pass filter (integrator/LPF) 250, a second voltage controlled oscillator 260 and a second FS circuit 270 advantageously form a PLL in the receiver 200.

Still referring to FIG. 1, the optical combiner 230 connected between preamplifier 220 and DBR 240 advantageously can be a 3 dB fiber optic coupler, which linearly combines a frequency translated sample of the Master Oscillator signal generated by FS circuit 270 with the received signal and delivers equal amplitude combined signals to two photodiode detectors 242, 244 in DBR 240. The optical signal at one detector can be represented by the equation:

$$A_{det}=A_{mp}\cos[(\omega_0-\omega_{vc2})t+\phi_0]+A_r\cos[(\omega_0+\omega_{vc1})(t-\tau)+\sigma(t-\tau/2)] \quad (3)$$

where $\delta(t-T/2)$ represents the phase modulation of the transmitter signal induced by the vibrations of the target and is given by $\delta(t-T/2)=2\omega_0\Delta x(t-T/2)/c$, where $\Delta x(t-T/2)$ is the vibrational displacement of the target. In a double balanced receiver 240, two such output signals are combined in a difference amplifier 246 that allows rejection of amplitude noise from the Master Oscillator 110. It will be appreciated that this technique is well known in the field of telecommunications and will not be discussed in any greater detail. Advantageously, the DBR 240 can include an automatic gain control circuit 248 to insure that the output of DBR 240 is suitable for further processing in I/LPF 250 and the micro-doppler baseband detector 290. It will be noted that the output of micro-doppler baseband detector 290 corresponds to the vibrational signature of the target while the output of I/LPF 250 permits extraction of both range and velocity, as discussed in greater detail below. It should be mentioned that I/LPF 250 beneficially can include filters for separating targets into various categories based on their doppler characteristic. For example, limiting target analysis to targets having a minimum doppler shift would avoid needless evaluation of stationary structures. In contrast, doppler filtering prior to analysis of a stationary object such as a bridge could avoid analysis of moving vehicles traveling over the bridge.

In order to recover the translational and micro-doppler information from the backscattered laser return, a frequency translated sample of the Master Oscillator is phase locked to the received signal. The FS circuit 270 in the receiver 200 translates the Master Oscillator frequency to $\omega_{lo}=\omega_0+\omega_{vc2}$ and this signal is used as the local oscillator signal provided to the optical mixer 230. The combination of the local oscillator signal and the received signal preferably is provided to double balanced receiver 240. The frequency $\omega_{vc2}$ output by the VCO 260 is controlled by the phase locked loop electronics so that the derived local oscillator signal tracks the received signal in phase. The ac component of detected photocurrent at each of the photodetectors 242, 244 in double-balanced receiver 240 is given by the equation:

$$i_s=KA_{mo}A_r\cos[(\omega_{vc2}-\omega_{vc1})t+\omega_0T+\phi_0-\sigma(t-T/2)] \quad (4)$$

It should be noted that the term $\omega_0T$ contains the translational doppler information, where $T=2R/c=2(R_0-vt)/c$, where $R_0$ is the range and $v$ is the closing velocity of the target. It will also be appreciated that the translational doppler frequency is therefore expressed as $\omega_d=-2\omega_0v/c$, which can be tracked out by the phase locked loop in the receiver, i.e., the loop essentially drives the output of each of the balanced detectors to the same amplitude and in effects sets $\omega_{vc2}-\omega_{vc1}=\omega_d+\omega_{\mu d}$, and hence the closing velocity is obtained from the mean value of the loop control voltage using range-velocity processing and display circuitry 280, which circuitry is well known to those of ordinary skill in the art and will not be discussed further. The micro-doppler signal is obtained by the micro-doppler baseband circuitry 290 from the ac component of the loop voltage when the loop is locked and tracking the net doppler frequency shift of the received signal. For a vibrational frequency of $\omega_{vib}$ the micro-doppler phase term above would be expressed as $2\omega_0\Delta x\cos\omega(t-T/2)/c$, which will be recovered as a component $\omega_{\mu d}$ on the loop control voltage.

Figure 7:
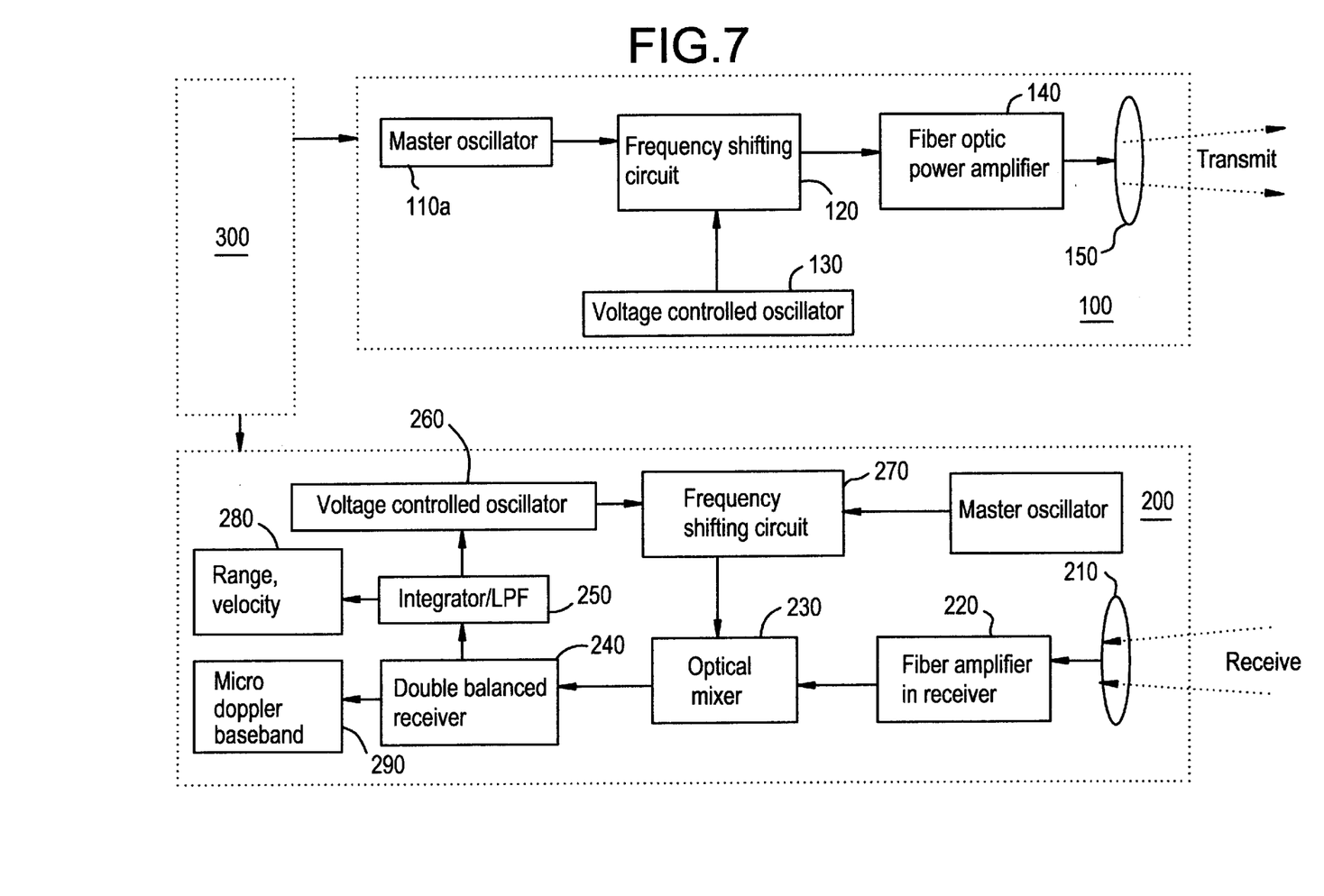
FIG. 7 is a high level block diagram of an alternative fiber optic micro-doppler ladar system according to another preferred embodiment of the present invention.

There are alternative methods to recover the translational and micro-doppler signals; these are considered variants on the present invention. For example, it will be noted that the micro-doppler ladar system according to the preferred illustrated in FIG. 1 is a homodyne system where a single master oscillator 110 advantageously can be used in both the transmitter 100 and the receiver 200. In an alternative embodiment according to the present invention, a heterodyne ladar system as shown in FIG. 7 uses first and second master oscillators 110a, 100b to generate the transmitted laser beam and to recover the backscattered laser beam, respectively.

Referring again to FIG. 1, the controller 300 advantageously can be coupled to transmitter 100 and receiver 200 so as to permit the transmitter and receiver to be operated in first and second modes of operation during analysis of a target of interest. It will be appreciated that gross analysis of velocity and range can be performed using the chirped frequency transmit laser beam. However, the chirped frequency transmit laser beam may not be well suited to fine analysis of the target. Therefore, in the preferred embodiment of FIG. 1, the VCO 130 is operated only until a gross range and velocity for the target of interest is obtained. During a second mode of operation, the VCO 130 is turned OFF, which permits the PLL (elements 230, 240, 250, 260 and 270) in receiver 200 to settle and, thus, provide a better environment for vibration signature extraction.

The chirped frequency is preferably selected so as to minimize SBS degradation in the transmit laser beam of transmitter 100. For that reason, the total power of the transmit beam can be expected to drop, which would normally result in a decrease in detection range using ladar system 1. It should be noted however that power amplifier 220 is a self-limiting component having a perceptible saturation characteristic. Stated another way, a drop in the backscattered signal strength would permit a higher gain in power amplifier 200. Thus, power amplifier 220 operates as if an automatic gain control circuit were part of the amplifier.

Advantageously, the present invention is not limited to systems for obtaining vibration signatures of objects; other parametric signatures advantageously can be obtained. For example, the backscattered beam produced by the chirped frequency transmit laser beam could be used to determine the IR absorption signature of the target. When the target is a relatively uniform metal object its absorption signature may be of little consequence; when the target is organic matter, the absorption signature may be used to determine one or more physical characteristics of the target. Thus, the vital signs of a remote person or animal, e.g., a wounded soldier down on a battlefield or a witness during testimony could easily be obtained.

It should also be understood that the present invention is not limited to fiber optic ladar systems but may include any remote vibration sensing system for which a clear line of sight is available to the target. As mentioned above, a significant application is in the remote sensing of target vibrations for non-cooperative target classification, damage assessment and intelligence gathering. Micro-doppler ladar equipment can also be used to measure the vibrational spectrum of bridges, buildings, pipelines, pumps, taxiing aircraft, volcanoes, and such. The data obtained can reveal the mechanical status of machinery and structures for a variety of purposes. It might even be feasible to obtain the vital signs of a remotely located person or animal, e.g. a wounded soldier down on a battlefield or a witness during testimony, as previously discussed.

The present invention was conceived as a result of analysis of the performance and performance limitations of the present 10.6 $\mu$m $CO_2$ system now under development in connection with the Radiant Mist program. While the sensitivity benefit of implementing a micro-doppler radar system at a shorter wavelength is obvious, no suitable sources, especially for the region between 1.06 $\mu$m and 2.05 $\mu$m, were available in the past. The potential availability of sufficient power from a rare-earth-doped single mode fiber amplifier for the micro-doppler application was not considered feasible prior to studies by the inventors that led to the High Power Fiber Optic Laser program. The advantages of a fiber optic micro-doppler radar system with respect to efficiency, performance, and packaging are unique.

The disclosed high power fiber optic based micro-doppler sensor can be built to detect and classify non-cooperative aircraft targets at ranges up to 100 km. In addition, a coherent transmitter array of high power fiber amplifiers, permits scaling to even greater ranges. The use of a sensitive optical fiber preamplifier also offers significant flexibility and benefits. The disclosed system is highly sensitive, compact, rugged, highly efficient, lightweight, reliable and can provide revolutionary installation flexibility. Since it leverages off developments in the telecommunications field, system costs are expected to be lower.

Finally, the fiber optic micro-doppler sensor application is a derivative of a proprietary laser weapon program carried out by the assignee. The High Power Fiber Optic Laser (HPFOL) used in the micro-doppler ladar system offers a practical way to scale to a hard-kill weapon performance level (100 kW–2 MW). The possibility exists that a common laser aperture might allow a target to be detected in a ladar mode, classified by its micro-doppler signature, and destroyed by increasing the power by 1000×.

The approach, i.e., ladar system and operating method therefor, discussed above is unique in its ability to scale the transmitter output power up to arbitrarily high levels to meet stringent range requirements. Since laser-diode-pumped rare-earth-doped optical fiber amplifiers can be tuned over a wavelength range of tens of nanometers, it is possible to select advantageous operating wavelengths that do not overlap the numerous fine absorption lines that occur in the atmosphere. The highly coherent laser signal required can be generated at conveniently low levels and amplified up to any output power level required. For certain applications at short ranges, a single high power amplifier may provide sufficient transmitter power. A particularly advantageous feature of the present invention is the capability to divide the signal between many amplifiers to generate the high power needed by a particular application.

The transmitter is basically modular and can be located or distributed wherever space is available in a vehicle because the power is being transmitted to the output aperture via a fiber optic bundle. Hence the micro-doppler ladar system according to the present invention requires no dedicated beam paths, rigid structures and precision beam relay optics, as are needed by a conventional ladar system. Moreover, the efficiency of the transmitter using laser-diode-pumped, rare-earth-doped optical fiber amplifiers in a phased array MO-PA will be much higher than a conventional diode pumped $TEM_{00}$ mode laser. The same rare-earth-doped fiber amplifier technology can be used to build a complementary ladar receiver based on sensitive pre-amplification of the optical signal received from the distant target.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A micro-doppler ladar system for identifying and analyzing a target of interest, comprising:

a transmitter for producing a transmit laser beam by amplification of a primary laser beam in an optical fiber amplifier;

a coherent receiver responsive to backscattered light produced by interaction of said transmit laser beam with the target of interest and generating range and velocity data and a characteristic signature of the target of interest; and a controller for controlling operation of said transmitter and said receiver.

2. The micro-doppler ladar system as recited in claim 1, wherein said controller permits the micro-doppler ladar system to operate in a target acquisition mode of operation in which said range and velocity data are produced and a signature acquisition mode of operation in which said characteristic signature is generated.

3. The micro-doppler ladar system as recited in claim 2, wherein said transmit laser beam generated during said target acquisition mode of operation is a chirped frequency transmit laser beam and wherein said transmit laser beam generated during said signature acquisition mode of operation is a mono-frequency transmit laser beam.

4. The micro-doppler ladar system as recited in claim 2, wherein said characteristic signature is a vibration signature.

5. The micro-doppler ladar system as recited in claim 1, wherein said optical fiber amplifier comprises:

N serially coupled rare earth doped optical fiber sections: and

N pump sources, each of said pump sources operatively connected to a corresponding one of said optical fiber sections, wherein N is an integer greater than or equal to 2.

6. The micro-doppler ladar system as recited in claim 5, wherein each of said optical fiber sections comprises a Yb:Er doped single mode optical fiber core.

7. The micro-doppler ladar system as recited in claim 1, wherein said optical fiber amplifier comprises:

a beam splitter receiving said primary laser beam and generating N secondary laser beams;

N parallel rare earth doped optical fiber sections, each of said optical fiber sections amplifying a respective one of said N secondary laser beams to thereby produce N tertiary laser beams; and an optical combiner combining said N tertiary laser beams to thereby produce said transmit laser beam, wherein N is an integer greater than or equal to 2.

8. The micro-doppler ladar system as recited in claim 7, wherein each of said optical fiber sections comprises a Yb:Er doped single mode optical fiber core.

9. The micro-doppler ladar system as recited in claim 7, wherein said N optical fiber amplifiers are connected to said combiner by a fiber optic bundle.

10. The micro-doppler ladar system as recited in claim 1, wherein said coherent receiver further comprises an optical fiber pre-amplifier for amplifying said backscattered light.

11. A micro-doppler ladar system for identifying and analyzing a target of interest, comprising:

first means for generating a primary laser beam;

second means for amplifying said primary laser beam in an optical fiber amplifier means so as to generate a transmit laser beam;

third means for transmitting said transmit laser beam towards the target of interest;

fourth means for receiving backscattered light produced by interaction between said transmit laser beam and the target of interest and for generating an electrical signal indicative of the target of interest;

fifth means for determining range and velocity responsive to said electrical signal; and sixth means for determining a characteristic signature of the target of interest different from both range and velocity.

12. The micro-doppler ladar system as recited in claim 11, wherein at least one parameter of said transmit laser beam varies so as to permit the micro-doppler ladar system to operate in a target acquisition mode of operation wherein range and velocity data are produced by said fifth means and a signature acquisition mode of operation wherein said characteristic signature is determined by said sixth means.

13. The micro-doppler ladar system as recited in claim 12, wherein said at least one parameter is frequency and wherein said transmit laser beam generated during said target acquisition mode of operation is a chirped frequency transmit laser beam and wherein transmit laser beam generated during said signature acquisition mode of operation is a mono-frequency transmit laser beam.

14. The micro-doppler ladar system as recited in claim 12, wherein said characteristic signature is a vibration signature.

15. The micro-doppler ladar system as recited in claim 11, wherein said second means comprises:

N serially coupled rare earth doped optical fiber sections: and

N pump sources, each of said pump sources operatively connected to a corresponding one of said optical fiber sections, wherein N is an integer greater than or equal to 2.

16. The micro-doppler ladar system as recited in claim 15, wherein each of said optical fiber sections comprises a Yb:Er doped single mode optical fiber core.

17. The micro-doppler ladar system as recited in claim 11, wherein said second means comprises:

beam splitting means for receiving said primary laser beam and generating N secondary laser beams;

parallel rare earth doped optical fiber section means for amplifying said N secondary laser beams in parallel to thereby produce amplified N tertiary laser beams; and optical combining means for combining said N tertiary laser beams to thereby produce said transmit laser beam, wherein N is an integer greater than or equal to 2.

18. The micro-doppler ladar system as recited in claim 17, wherein said optical fiber section means comprise N Yb:Er doped single mode optical fiber cores connected in parallel.

19. The micro-doppler ladar system as recited in claim 17, wherein an optical fiber bundle couples said optical fiber amplifier means to said combining means.

20. The micro-doppler ladar system as recited in claim 11, wherein said fourth means further comprises an optical fiber pre-amplifier means for amplifying said backscattered light.

21. A method of operating a micro-doppler ladar system including a transmitter and coherent receiver for identifying and analyzing a target of interest, the method comprising the steps of:

generating a primary laser beam;

amplifying said primary laser beam in an optical fiber amplifier so as to generate a transmit laser beam;

transmitting said transmit laser beam towards the target of interest;

receiving backscattered light produced by interaction between said transmit laser beam and the target of interest and for generating an electrical signal indicative of the target of interest;

determining range and velocity responsive to said electrical signal; and ascertaining a characteristic signature of the target of interest different from both range and velocity.

22. The method for operating a micro-doppler ladar system as recited in claim 21, wherein the generating step comprises the step of generating said primary laser beam switching repeatedly between first and second frequency characteristics;

wherein the determining step is performed while said primary laser beam exhibits said first frequency characteristic; and wherein the ascertaining step is performed while said primary laser beam exhibits said second frequency characteristic.

23. The method for operating a micro-doppler ladar system as recited in claim 21, wherein said characteristic signature is a vibration signature.

24. The method for operating a micro-doppler ladar system as recited in claim 21, wherein the amplifying step comprises the substeps of:

splitting said primary laser beam into N secondary laser beams;

amplifying said N secondary laser beams in parallel optical fiber sections to thereby produce amplified N tertiary laser beams; and combining said N tertiary laser beams to thereby produce said transmit laser beam, wherein N is an integer greater than or equal to 2.

25. The method for operating a micro-doppler ladar system as recited in claim 24, wherein said parallel optical fiber sections comprise N Yb:Er doped single mode optical fiber cores connected in parallel.

26. A transmitter for a micro-doppler ladar system adapted to identify and analyze a target of interest, comprising:

a master oscillator for generating a primary laser beam;

a voltage controlled oscillator (VCO) for generating a VCO signal having a predetermined, repetitive frequency pattern;

a frequency shifting device for varying the frequency of said primary laser beam responsive to said VCO signal to thereby produce a frequency-varying primary laser signal; and an optical fiber amplifier for amplifying said frequency-varying primary laser signal to thereby produce a transmit laser beams wherein said optical fiber amplifier comprises:

N serially coupled rare earth doped optical fiber sections: and

N pump sources, each of said pump sources operatively connected to a corresponding one of said optical fiber sections, wherein N is an integer greater than or equal to 2.

27. The transmitter for the micro-doppler ladar system as recited in claim 26, wherein each of said optical fiber sections comprises a Yb:Er doped single mode optical fiber core.

28. A transmitter for a micro-doppler ladar system adapted to identify and analyze a target of interest, comprising:

a master oscillator for generating a primary laser beam;

a voltage controlled oscillator (VCO) for generating a VCO signal having a predetermined, repetitive frequency pattern;

a frequency shifting device for varying the frequency of said primary laser beam responsive to said VCO signal to thereby produce a frequency-varying primary laser signal; and an optical fiber amplifier for amplifying said frequency-varying primary laser signal to thereby produce a transmit laser beam, wherein said optical fiber amplifier comprises:

a beam splitter receiving said frequency-varying primary laser beam and generating N secondary laser beams;

N parallel rare earth doped optical fiber sections, each of said optical fiber sections amplifying a respective one of said N secondary laser beams to thereby produce N tertiary laser beams; and an optical combiner combining said N tertiary laser beams to thereby produce said transmit laser beam, wherein N is an integer greater than or equal to 2.

29. The transmitter for the micro-doppler ladar system as recited in claim 28, wherein each of said optical fiber sections comprises a Yb:Er doped single mode optical fiber core.

30. The transmitter for the micro-doppler ladar system as recited in claim 28, wherein said N optical fiber amplifiers are connected to said combiner by a fiber optic bundle.

31. The transmitter for the micro-doppler ladar system as recited in claim 28, wherein each of said N rare earth doped optical fiber sections further comprises:

M serially coupled rare earth doped optical fiber sections: and

M pump sources, each of said pump sources operatively connected to a corresponding one of said optical fiber sections, wherein M is an integer greater than or equal to 2.

32. A micro-doppler ladar system for identifying and analyzing a target of interest, comprising:

a transmitter for producing a transmit laser beam by amplification of a primary laser beam in an optical fiber amplifier, said amplifier including:

a master oscillator for generating the primary laser beam;

a voltage controlled oscillator (VCO) for generating a VCO signal having a predetermined, repetitive frequency pattern;

a frequency shifting device for varying the frequency of said primary laser beam responsive to said VCO signal to thereby produce a frequency-varying primary laser signal; and an optical fiber amplifier for amplifying said frequency-varying primary laser signal to thereby produce a transmit laser beam;

a coherent receiver responsive to backscattered light produced by interaction of said transmit laser beam with the target of interest and generating range and velocity data and a characteristic signature of the target of interest, said coherent receiver including:

an optical fiber pre-amplifier for amplifying said backscattered light to thereby produce an amplified return laser beam;

a phase locked loop receiving said primary laser beam and said amplified return laser beam for generating an electrical signal indicative of range, velocity and a characteristic signature of the target of interest; and a controller for controlling operation of said transmitter and said receiver in a target acquisition mode of operation in which said range and velocity data are easily extracted from said electrical signals and a signature acquisition mode of operation in which said characteristic signature is easily extracted from said electrical signal.

33. The micro-doppler ladar system as recited in claim 32, wherein said optical fiber amplifier comprises:

N serially coupled rare earth doped optical fiber sections: and

N pump sources, each of said pump sources operatively connected to a corresponding one of said optical fiber sections, wherein N is an integer greater than or equal to 2.

34. The micro-doppler ladar system as recited in claim 33, wherein each of said optical fiber sections comprises a Yb:Er doped single mode optical fiber core.

35. The micro-doppler ladar system as recited in claim 32, wherein said optical fiber amplifier comprises:

a beam splitter receiving said frequency-varying primary laser beam and generating N secondary laser beams;

N parallel rare earth doped optical fiber sections, each of said optical fiber sections amplifying a respective one of said N secondary laser beams to thereby produce N tertiary laser beams; and an optical combiner combining said N tertiary laser beams to thereby produce said transmit laser beam, wherein N is an integer greater than or equal to 2.

36. The micro-doppler ladar system as recited in claim 35, wherein each of said optical fiber sections comprises a Yb:Er doped single mode optical fiber core.

37. The micro-doppler ladar system as recited in claim 35, wherein said N optical fiber amplifiers are connected to said optical combiner by a fiber optic bundle.

38. The micro-doppler ladar system as recited in claim 35, wherein each of said N rare earth doped optical fiber sections further comprises:

M serially coupled rare earth doped optical fiber sections: and

M pump sources, each of said pump sources operatively connected to a corresponding one of said optical fiber sections, wherein M is an integer greater than or equal to 2.

39. The micro-doppler ladar system as recited in claim 32, wherein said optical fiber amplifier comprises:

a beam splitter receiving said frequency-varying primary laser beam and generating N secondary laser beams;

N phase modulators responsive to N phase error signals for controlling the phase of each of said n secondary laser beams so as to produce N phase modulated secondary laser beams, respectively;

N parallel rare earth doped optical fiber sections, each of said optical fiber sections amplifying a respective one of said N phase modulated secondary laser beams to thereby produce N tertiary laser beams;

an optical combiner combining said N tertiary laser beams to thereby produce said transmit laser beam;

circuitry for detecting phase errors in said N tertiary laser beams and for generating respective ones of said N phase error signals, wherein N is an integer greater than or equal to 2, and wherein said N tertiary laser beams arrive at said optical combiner with a predetermined phase profile.

40. The micro-doppler ladar system as recited in claim 39, wherein each of said optical fiber sections comprises a Yb:Er doped single mode optical fiber core.

41. The micro-doppler ladar system as recited in claim 39, wherein said N optical fiber amplifiers are connected to said optical combiner by a fiber optic bundle.

42. The micro-doppler ladar system as recited in claim 39, wherein each of said N rare earth doped optical fiber sections further comprises:

M serially coupled rare earth doped optical fiber lengths for generating a respective one of said N tertiary laser beams: and M pump sources, each of said pump sources operatively connected to a corresponding one of said optical fiber lengths for pumping an associated one of said M optical fiber lengths, wherein M is an integer greater than or equal to 2.

* * * * *